United States Patent [19]
Eitz

[11] Patent Number: 5,650,826
[45] Date of Patent: Jul. 22, 1997

[54] METHOD FOR DECODING IMAGE/SOUND DATA CONTAINED INTELETEXT DATA OF A DIGITAL TELEVISION SIGNAL

[75] Inventor: Gerhard Eitz, Poing, Germany

[73] Assignee: Thomson Consumer Electronics Sales GmbH, Germany

[21] Appl. No.: 388,858

[22] Filed: Feb. 15, 1995

[30] Foreign Application Priority Data

Feb. 17, 1994 [DE] Germany .................. 44 05 020.8

[51] Int. Cl.[6] .................. H04N 7/00; H04N 7/087
[52] U.S. Cl. .................. 348/468; 348/478; 348/906
[58] Field of Search .................. 348/906, 468, 348/460, 461, 478, 482, 483, 484, 485

[56] References Cited

U.S. PATENT DOCUMENTS

| | | | |
|---|---|---|---|
| 4,535,356 | 8/1985 | Nakagawa et al. | 348/460 |
| 5,036,394 | 7/1991 | Morii et al. | 348/468 |
| 5,237,411 | 8/1993 | Fink et al. | 348/468 |
| 5,335,073 | 8/1994 | Yamamoto | 348/478 |
| 5,355,170 | 10/1994 | Eitz et al. | 348/468 |
| 5,375,160 | 12/1994 | Guidon et al. | 348/468 |
| 5,410,359 | 4/1995 | Odijk et al. | 348/468 |
| 5,444,499 | 8/1995 | Saitoh | 348/906 |

*Primary Examiner*—Victor R. Kostak
*Assistant Examiner*—John W. Miller
*Attorney, Agent, or Firm*—Joseph S. Tripoli; Joseph J. Laks; Sammy S. Henig

[57] ABSTRACT

A data stream is separated from a television signal during the reception of data transmitted in the television signal. The data associated with a given page are collected. The pages thus assembled are temporarily stored. One or more separated pages with lists are transmitted and processed by the decoder at the receiver. Images and image sequences, if necessary, together with a text page, are displayed and sounds are reproduced using circuitry, such as the image and sound decoders, respectively, that already exist in a receiver compatible with digital signal transmission. A given separate page, referred to as the text-image-sound link table, contains addressing information and corresponding codes for image and/or sound data which are in the data stream. The separate page also contains search words and the text page numbers associated with the search words. When a specifically highlighted search word is selected by the user in a selected text page, a selection process is initialized. In the selection process, the user selected search word and the associated addressing information are obtained in the separate page under the page number of the selected text page. Based on the selected addressing information, the corresponding image and sound data are retrieved and reproduced in accordance with the code.

4 Claims, 4 Drawing Sheets

```
              0001                    0031
        1FA                     1FA
                                              IMAGE, SOUND DATA
```

```
  1FA
  301, "Weather" :B, IFA 0001
       T, IFA 0010
       "Joyrobic" :B, IFA 0031
  302 ......
```
TEXT-IMAGE-SOUND LINK TABLE

```
  301
  9:00   Weather
         in Europe
  9:10   Joyrobic
```
TEXT PAGE

FIG.2

```
301 >    301 ARD/ZDF Mo 31.01.94 09:16:28
ARD                                Monday,
                            31.January 1994

09:00      in Europe
09:10      JOYrobic
09:45
10:00      today
10:03
10:45      To each his Right!.......306

11:00
11:03      Money or Love
12:45
12:55      Press show
13:00      ZDF-
           with todays news
           until 1:45...............313

============= Afternoon Program on 302
```

METHOD FOR DECODING IMAGE/SOUND DATA CONTAINED INTELETEXT DATA OF A DIGITAL TELEVISION SIGNAL

The invention relates to a method for receiving data transmitted in a television signal.

In the conventional Teletext system currently used in Europe (with the exception of France), the so-called "Level 1" of the Teletext standard WST (World System Teletext) is used. Level 1 teletext allows texts and graphic representations to be displayed with a restricted basic character set on a screen. A teletext page consists of a head row and 23 rows.

As is known from German Patent DE 39 14 697 C2, further supplementary data for special characters, fine structures and color shadings can be transmitted with Level 1 in addition to text pages. At the receiving end, the associated supplementary data are temporarily stored in addition to the Level 1 text page and are displayed on the screen together with the relevant Level 1 page. The fine structures are transmitted pixel by pixel in special supplementary pages without using compression methods.

It is also known from published British patent application GB 2146878A to provide for a simplified selection of Teletext pages by means of search words. In addition to the search words, which are displayed on the screen together with a given Teletext page in a 24th row, associated page numbers are transmitted in a hidden manner in a further row.

It may be desirable to display images and image sequences, for example, together with a text page, and to reproduce sounds, by mainly utilizing the already existing circuitry for digital signal processing in a receiver. Such existing circuitry may include circuitry for image and sound decoding. Such feature may be used in the future to supplement text service.

In accordance with an inventive feature, the display of images and the reproduction of sounds, if necessary, are provided following a request by the user. A text-image-sound link table is transmitted together with the text, image and sound data. The decoder retrieves the image and sound data in accordance with the text-image-sound link table. A code that is also transmitted is used for selectively applying the retrieved image and sound data to the display screen and to a sound transducer such as a loudspeaker, respectively.

FIG. 2 shows a diagrammatic representation of a text page with the text-image-sound link table according to the invention and the associated image and sound data;

Figure 1:
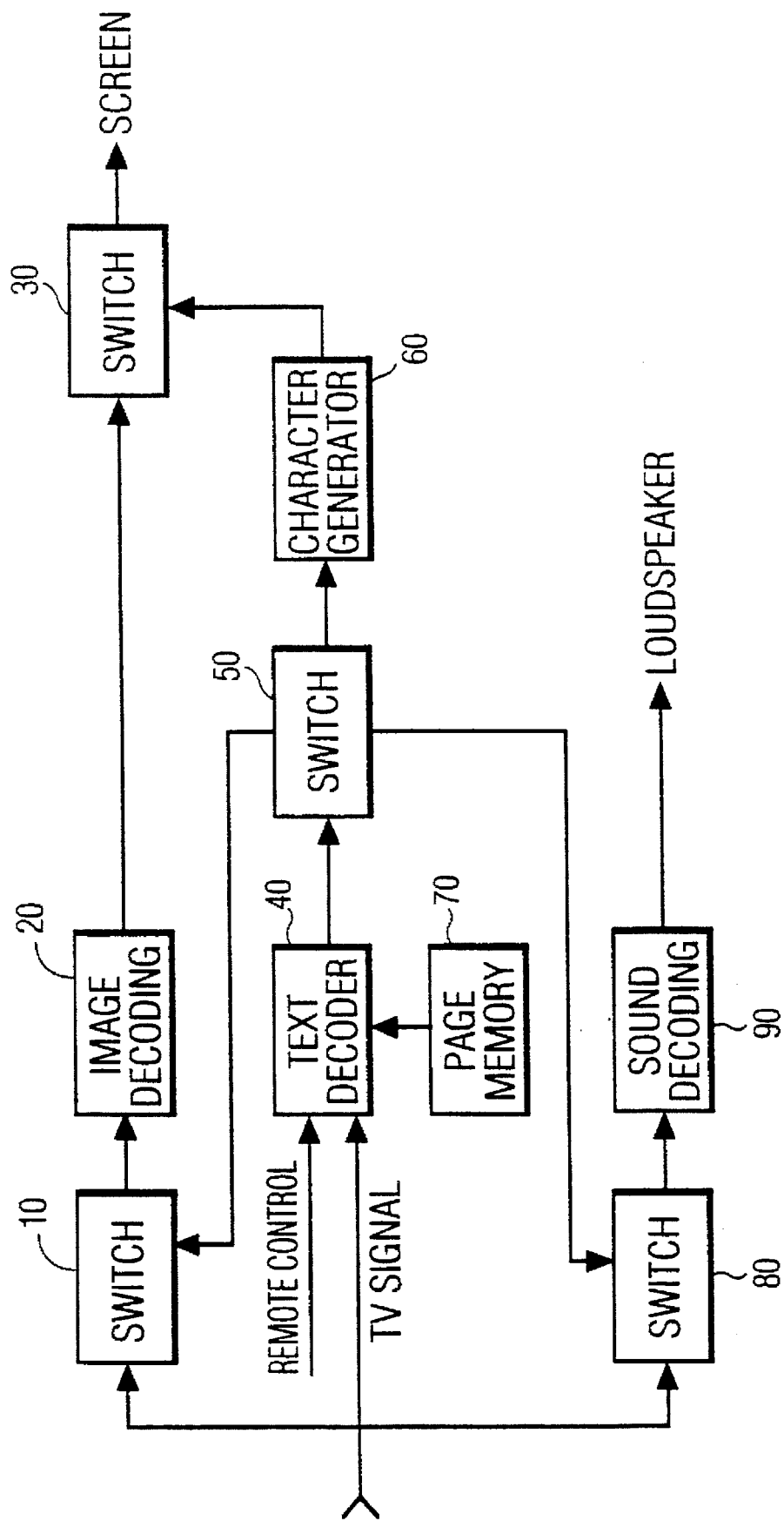
FIG. 1 shows a diagrammatic representation of a digital television receiver having a text decoder, the facilities for image and sound decoding and the corresponding transducers, according to an aspect of the invention.

FIG. 1 shows a block diagram of a television receiver for digital transmission. A digital television signal containing non-teletext picture and sound information encoded in, for example, digital techniques and also teletext information encoded in digital techniques is applied via a switch 10 to an image decoder 20 which decodes the television image data and displays them on the screen via a switch 30. The television signal is also applied via a switch 80 to a sound decoder 90 which reproduces the decoded sounds in a loudspeaker. In addition, a text decoder 40, controlled by remote control, separates the text, image and sound data derived from the incoming digital television signal and temporarily stores them in a memory 70. Upon a request by the user, a desired text page is supplied from the memory 70 via a switch 50 to a character generator 60. The requested text page is displayed on the screen via the switch 30.

In addition, the decoder loads a separate text-image-sound link table and searches for search words. The search words are entered in the table under the requested page and are displayed in a suitable manner on the screen together with the associated text page. If the user desires further information on one of the subjects mentioned in the search words, he selects the relevant search words by means of, for example, a movable marker or cursor. The decoder then searches in the text-image-sound link table for a code and for addressing information associated with the selected search word. If the data retrieved according to the addressing information are identified by the code as being image data, the image data are applied from the memory via the switch 50 and 10 to the image decoder 20 and displayed on the screen via the switch 30. If, on the other hand, sound data are identified by the code, they are applied from the memory to the sound decoder 90 via the switch 80 to provide an audio signal to the loudspeaker.

FIG. 2 diagrammatically shows the text-image-sound link table with a text page and associated image and sound data. For example, the text-image-sound link table '1FA'contains, under the page number of text page '301', a search word 'weather'. The search word 'weather'is associated in the table with a code 'B' identifying image data, and with an address word '1FA 001', providing the address of the associated image data. In addition, further sound data can be retrieved with the same search word in accordance with the address word '1FA 0010' and a code 'T' identifying sound data. In addition, the text-image-sound link table contains further entries with codes and addresses under the search word 'JOYrobic' for text page '301' and for text page '302'. In addition, further codes are possible for image and sound data which are automatically retrieved and applied to the corresponding transducer directly when the text page is retrieved, without request by the user.

Figures 3, 4:
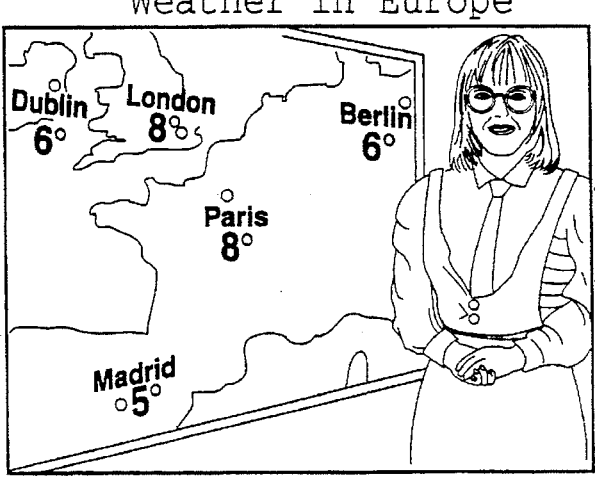
FIG. 3 shows a text page with a program preview and the search words emphasized by the decoder in accordance with the text-image-sound link table.
FIG. 4 shows the text page according to FIG. 3 with an image associated with a particular program designation.

To explain the invention, FIG. 3 shows a text page with a program preview page according to the invention. The decoder marks or highlights the search words 'weather', 'JOYrobic', etc., in the selected text page '301' in accordance with the text-image-sound link table. It is also possible for the decoder to display the search words that are valid for a selected text page in a separate area on the screen.

FIG. 4 shows the program preview page '301' after selection of the search word 'weather' by the user. Instead of the associated image being displayed, image sequences can also be reproduced.

Figures 5, 6:
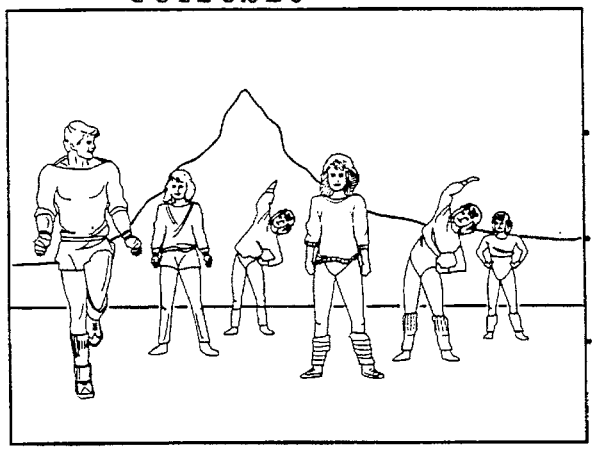
FIG. 5 shows the text page according to FIG. 3 with an image associated with a further program designation.
FIG. 6 shows a special page, of the type forming a TV program guide, in which images for program designations of various broadcasting stations are displayed together with the associated broadcasting times.

FIG. 5 shows the program preview page '301' after selection of the search word 'JOYrobic'.

FIG. 6 shows a format for distinctly displaying images of program designations for a TV program guide. In this arrangement, the text decoder assembles the images, which have been appropriately reduced in size, from designations of various broadcasting stations (in this case from ARD and ZDF). The images are assembled with the associated broadcasting times in a special overview page by means of the text-image-sound link table. In addition, the user can use the remote control to display other designations at other broadcasting times or from other broadcasting stations.

What is claimed is:

1. A method for processing a digitally coded television signal containing non-teletext image data, non-teletext sound data and teletext data, comprising the steps of:

a) separating and assembling said teletext data in pages and storing at least one of said pages in a temporary storage, said pages including at least a first page containing a list of search words, text page numbers associated with said search words, addressing information and selection codes for additional image data and/or sound data contained in said teletext data;
   and responsive to user selection of a text page of said pages and user selection of a first search word in said selected text page, b) selecting from said first page the addressing information and the code in accordance with the selected text page number and the selected search word;

c) retrieving said additional image data and/or sound data in accordance with the selected addressing information; and d) reproducing the retrieved additional image data and/or sound data in accordance with the selected code such that said additional image data and/or sound data of said teletext data are decoded in a common data decoder where the corresponding non-teletext image and sound data are decoded.

2. A method according to claim 1 wherein said retrieved image data are displayed on a screen of a display device together with the text of the selected text page.

3. A television apparatus, comprising:

a source of a digitally coded television signal containing non-teletext image data, non-teletext sound data and teletext data;

a teletext decoder responsive to said television signal for separating and assembling said data in pages and storing at least one of said pages in a temporary storage, said pages including at least a first page containing a list of search words, text page numbers associated with said search words, addressing information and selection codes for additional image and/or sound data contained in said teletext data; and a processor responsive to a user selection of a first search word in a selected text page for selecting from said first page the addressing information and the selection code, in accordance with the selected text page number and the selected search word, said processor retrieving the corresponding additional image and/or sound data, in accordance with the selected addressing information and reproducing the retrieved data in accordance with the selected code such that said additional image and/or sound data of said teletext data are decoded in a common data decoder where the corresponding non-teletext image and sound data are decoded.

4. An apparatus according to claim 3 further comprising, a character generator and a data selector for selectively applying said retrieved data to said character generator to convert said retrieved data into an R-G-B signal.

* * * * *